(12) United States Patent
Prasad et al.

(10) Patent No.: US 11,646,940 B2
(45) Date of Patent: *May 9, 2023

(54) INTENT DRIVEN NETWORK POLICY PLATFORM

(71) Applicant: Cisco Technology, Inc., San Jose, CA (US)

(72) Inventors: Rohit Prasad, Sunnyvale, CA (US);
Shashi Gandham, Fremont, CA (US);
Hoang Nguyen, Pleasanton, CA (US);
Abhishek Singh, Pleasanton, CA (US);
Shih-Chun Chang, San Jose, CA (US);
Navindra Yadav, Cupertino, CA (US);
Ali Parandehgheibi, Sunnyvale, CA (US); Paul Mach, Oakland, CA (US);
Rachita Agasthy, Sunnyvale, CA (US);
Ravi Prasad, Fremont, CA (US);
Varun Malhotra, Sunnyvale, CA (US);
Michael Watts, Mill Valley, CA (US);
Sunil Gupta, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/482,411

(22) Filed: Sep. 22, 2021

(65) Prior Publication Data

US 2022/0014436 A1      Jan. 13, 2022

Related U.S. Application Data

(63) Continuation of application No. 16/820,404, filed on Mar. 16, 2020, now Pat. No. 11,146,454, which is a
(Continued)

(51) Int. Cl.
*H04L 41/0893* (2022.01)
*H04L 41/0853* (2022.01)

(52) U.S. Cl.
CPC ...... *H04L 41/0893* (2013.01); *H04L 41/0856* (2013.01)

(58) Field of Classification Search
CPC .............. H04L 41/0893; H04L 41/0856
See application file for complete search history.

(56) References Cited

U.S. PATENT DOCUMENTS

| | | |
|---|---|---|
| 8,239,365 B2 | 8/2012 | Salman |
| 8,272,875 B1 | 9/2012 | Jurmain |

(Continued)

*Primary Examiner* — Sm A Rahman
(74) *Attorney, Agent, or Firm* — Polsinelli

(57) ABSTRACT

The disclosed technology relates to intent driven network management. A system is configured to maintain an inventory store comprising records for a set of network entities in a network, wherein each network entity in the set of network entities is associated with a record in the inventory store. The system receives a user intent statement comprising an action and a flow filter representing network data flows on which the action is to be applied and queries, based on the flow filter, the inventory store to identify a plurality of network entities in the set of network entities to which the user intent statement applies. The system generates a plurality of network policies that implement the user intent statement based on the plurality of network entities and the action and enforces the plurality network policies.

18 Claims, 10 Drawing Sheets

Related U.S. Application Data continuation of application No. 15/470,410, filed on Mar. 27, 2017, now Pat. No. 10,594,560.

(56) References Cited

U.S. PATENT DOCUMENTS

| | | | |
|---|---|---|---|
| 8,683,548 B1 | 3/2014 | Curry et al. | |
| 9,280,788 B2 * | 3/2016 | Ferrari | G06Q 30/06 |
| 10,129,100 B2 * | 11/2018 | Hinrichs | H04L 41/5009 |
| 10,992,520 B2 * | 4/2021 | Lee | H04L 12/6418 |
| 2005/0138157 A1 | 6/2005 | Jung et al. | |
| 2005/0182681 A1 | 8/2005 | Bruskotter et al. | |
| 2010/0290366 A1 * | 11/2010 | Garcia | H04L 43/065 |
| | | | 370/254 |
| 2011/0010344 A1 | 1/2011 | Sjogren | |
| 2013/0085889 A1 | 4/2013 | Fitting et al. | |
| 2014/0129942 A1 | 5/2014 | Rathod | |
| 2014/0224784 A1 | 8/2014 | Kohler | |
| 2015/0052028 A1 | 2/2015 | Wooden et al. | |
| 2016/0020959 A1 | 1/2016 | Rahaman | |
| 2017/0032310 A1 | 2/2017 | Mimnaugh | |
| 2017/0140270 A1 | 5/2017 | Mnih et al. | |
| 2018/0032864 A1 | 2/2018 | Graepel et al. | |
| 2018/0278478 A1 | 9/2018 | Prasad et al. | |

\* cited by examiner

Inventory Store

| Entity_ID | Location | OS | Dept. | Interface | Funct. | Annot. | ... | ToR | Scope | ... |
|---|---|---|---|---|---|---|---|---|---|---|
| 1 | MTV | Windows8 | IT | | User PC | | | | | |
| 2 | RTP | Ubuntu | HR | | WebServer | | | | | |
| 3 | MTV | WinServ08 | Finance | | AppServer | | | | | |
| 4 | TX | LinuxVM | IT | | AppServer | | | | | |
| 5 | RTP | PC | Eng. | | User PC | | | | | |
| ... | ... | ... | ... | ... | ... | ... | ... | ... | ... | ... |

300 — Inventory_Filter_1     All inventory items on linux machines in VRF ID 676767

```
{
"type": "and", "filters": [
  {"type": "regex", "field": "sensors.platform", "value": "linux"},
  {"type": "eq", "field": "vrf_id", "value": "676767"}
]
}
```

350 — Inventory_Filter_2     End point group representing 10.0.0.0/8 and 1.1.11.0/24 subnets

```
{
"type": "or", "filters": [
  {"type": "subnet", "field": "ip", "value": "10.0.0.0/8"},
  {"type": "subnet", "field": "ip", "value": "1.1.11.0/24"}
]
}
```

FIG. 3

```
* Inventory filter for 10.0.0.0/8:
  _id: 1
  query: { "type": "subnet", "field": "ip", "value": "10.0.0.0/8" }

* Inventory filter for 11.0.0.1:
  _id: 2
  query: { "type": "subnet", "field": "ip", "value": "11.0.0.1/32" }

* Flow filter query:
{
  "type": "and", "filters": [
    { "type": "inventory_filter", "field": "src", "id": "1" },
    { "type": "inventory_filter", "field": "dst", "id": "2" },
    { "type": "eq", "field": "proto", "value": "6" }
  ]
}
```

405 — Inventory filter for 10.0.0.0/8
410 — Inventory filter for 11.0.0.1
400 — Flow filter query

FIG. 4

United States Patent US 11,646,940 B2

INTENT DRIVEN NETWORK POLICY PLATFORM

CROSS-REFERENCE TO RELATED APPLICATIONS

This application is a continuation of U.S. Non-Provisional patent application Ser. No. 16/820,404, filed Mar. 16, 2020, which is a continuation of U.S. Non-Provisional patent application Ser. No. 15/470,410, filed Mar. 23, 2017, now U.S. Pat. No. 10,594,560, the full disclosures of each are incorporated herein by reference in their entireties.

TECHNICAL FIELD

The subject matter of this disclosure relates in general to the field of computer networks, and more specifically for management of entities and resources within a computer network.

BACKGROUND

A managed network, such as an enterprise private network (EPN), may contain a large number of entities distributed across the network. These entities include, for example, nodes, endpoints, machines, virtual machines, containers (an instance of container-based virtualization), and applications. In addition to being different types, these entities may be grouped in different departments, located in different geographical locations, and/or serve different functions.

An expansive or thorough understanding of the network can be critical for network management tasks such as anomaly detection (e.g., network attacks and misconfiguration), network security (e.g., preventing network breaches and reducing network vulnerabilities), asset management (e.g., monitoring, capacity planning, consolidation, migration, and continuity planning), and compliance (e.g. conformance with governmental regulations, industry standards, and corporate policies). Traditional approaches for managing large networks require comprehensive knowledge on the part of highly specialized human operators because of the complexities of the interrelationships among the entities.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which:

FIG. 2 is an illustration showing contents of an inventory store, in accordance with various embodiments of the subject technology;

FIG. 3 illustrates two examples of inventory filters, in accordance with various embodiments of the subject technology;

FIG. 4 illustrates an example flow filter incorporating two inventory filters, in accordance with various embodiments of the subject technology;

DESCRIPTION OF EXAMPLE EMBODIMENTS

Figure 1:
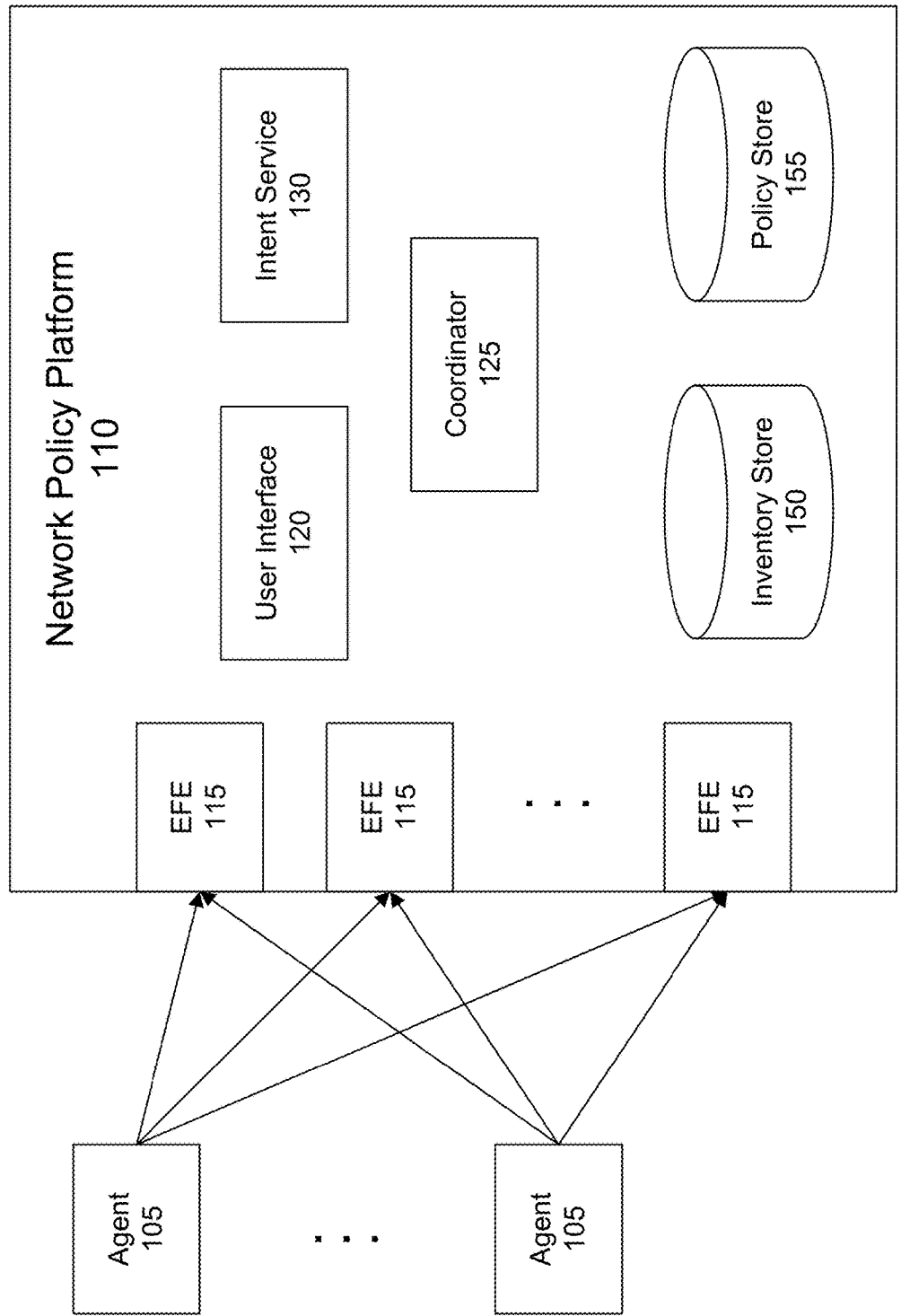
FIG. 1 is a conceptual block diagram illustrating an example of an intent driven network policy platform, in accordance with various embodiments of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Large networks often require comprehensive knowledge on the part of highly specialized human operators (e.g., network administrators) to effectively manage. However, controls available to the human operators are not very flexible and the human operators with the specialized knowledge able to manage the network(s) are often not the individuals with a higher level understanding of how the network should operate with respect to certain applications or functionalities. Furthermore, once a change in network management is executed, it is often difficult to roll back the changes, make alterations, or understand the changes, even for network operators.

The disclosed technology addresses the need in the art for a more intuitive way to manage a network and a way to manage the network in a more targeted manner. For example, many networks may be secured using access control lists (ACLs) implemented by routers and switches to permit and restrict data flow within the network. When an ACL is configured on an interface, the network device examines data packets passing through the interface to determine whether to forward or drop the packet based on the criteria specified within the ACLs. Each ACL includes entries where each entry includes a destination target internet protocol (IP) address, a source target IP address, and a statement of permission or denial for that entry.

The ACLs, however, may be difficult for application developers and other users with limited knowledge of network engineering to understand and use. A development team that builds a particular application, set of applications, or function(s) (e.g., an "application owner") is typically not responsible for managing an enterprise network and are not expected to have a deep understanding of the network. The application owner understands at a high level how certain applications or functions should operate, which entities should be allowed or restricted from communicating with other entities, and how entities should be allowed or restricted from communicating with other entities (e.g., which ports and/or communication protocols are allowed or restricted). In order to implement desired network policies, the application owner must contact a network operator and communicate their objectives to the network operator. The network operator tries to understand the objectives and then creates ACL entries that satisfy the application owner's objectives.

Even relatively simple network policies take hundreds, thousands, or more ACL entries to implement and ACLs often end up containing millions of entries. For example, to implement a simple network rule where a first subnet of machines cannot communicate with a second subnet of machines requires 2(m×n) ACL entries for a number of m endpoints in the first subnet and a number of n endpoints in the second subnet to explicitly list out each IP address in the first subnet that cannot send data to each IP address in the second subnet and each IP address in the second subnet cannot send data to each IP address in the first subnet. The size of the ACLs can further complicate matters making intelligently altering the ACLs increasingly difficult. For example, if an application owner wants to alter the implemented network policies, it is difficult for the application owner or the network operator to know which ACL entries were created based on the original network policy and, as a result, difficult to identify ACL entries to add, delete, or modify based on the alteration of the network policies.

Furthermore, traditional ACLs permit and restrict data flow within the network at the machine level. For example, ACL entries permit or restrict communication based on a destination target internet protocol (IP) address and a source target IP address. However, in some cases, applications on one network entity (e.g., a physical server, virtual machine, container, etc.) should be able to communicate with other applications on a different network entity, but other communications between the entities should be restricted for security reasons (e.g., some hackers may take advantage of broad traditional ACL entries and use applications to gain access to other areas of the network). Traditional ACL entries are unable to accommodate for more tailored control of network traffic.

Various embodiments of the subject technology address these and other technical problems by providing an intent driven network policy platform that allows both application owner and network operators to define network policies in a more understandable manner and provides these users with finer levels of controls.

DETAILED DESCRIPTION

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

Various embodiments relate to an intent driven network policy platform configured to ingest network data and generate an inventory of network entities. The network policy platform receives a user intent statement, translates the intent into network policies, and enforces the network policies.

FIG. 1 is a conceptual block diagram illustrating an example network environment 100 that includes an intent driven network policy platform 110, in accordance with various embodiments of the subject technology. Various embodiments are discussed with respect to an enterprise private network (EPN) for illustrative purposes. However, these embodiments and others may be applied to other types of networks. For example, the network environment 100 may be implemented by any type of network and may include, for example, any one or more of a cellular network, a satellite network, a personal area network (PAN), a local area network (LAN), a wide area network (WAN), a broadband network (BBN), the Internet, and the like. The network environment 100 can be a public network, a private network, or a combination thereof. The network environment 100 may be implemented using any number of communications links associated with one or more service providers, including one or more wired communication links, one or more wireless communication links, or any combination thereof. Additionally, the network environment 100 can be configured to support the transmission of data formatted using any number of protocols.

The network environment 100 includes one or more network agents 105 configured to communicate with an intent driven network policy platform 110 via enforcement front end modules (EFEs) 115. The intent driven network policy platform 110 is shown with one or more EFEs 115, a user interface module 120, a coordinator module 125, an intent service module 130, an inventory store 150, and a policy store 155. In other embodiments, the intent driven network policy platform 110 may include additional components, fewer components, or alternative components. The network policy platform 110 may be implemented as a single machine or distributed across a number of machines in the network.

Each network agent 105 may be installed on a network entity and configured to receive network policies (e.g., enforcement policies, configuration policies, etc.) from the network policy platform 110 via the enforcement front end modules 115. After an initial installation on a network entity (e.g., a machine, virtual machine, or container, etc.), a network agent 105 can register with the network policy platform 110 and communicate with one or more EFEs to receive network policies that are configured to be applied to the host on which the network agent 105 is running. In some embodiments, the network policies may be received in a high-level, platform independent format. The network agent 105 may convert the high-level network policies into platform specific policies and apply any number of optimizations before applying the network policies to the host network entity. In some embodiments, the high-level network policies may be converted at the network policy platform 110.

Each network agent 105 may further be configured to observe and collect data and report the collected data to the intent driven network policy platform 110 via the EFEs 115. The network agent 105 may collect policy enforcement related data associated with the host entity such as a number of policies being enforced, a number of rules being enforced, a number of data packets being allowed, dropped, forwarded, redirected, or copied, or any other data related to the enforcement of network policies. The network agent 105 may also collect data related to host entity performance such as CPU usage, memory usage, a number of TCP connections, a number of failed connection, etc. The network agent 105 may also collect other data related to the host such as an entity name, operating system, entity interface information, file system information, applications or processes installed or running, or disks that are mounted.

The enforcement front end modules (EFEs) 115 are configured to handle the registration of the network agents 105 with the network policy platform 110, receive collected data from the network agents 105, and store the collected data in inventory store 150. The EFEs may be further configured to store network policies (high-level platform independent policies or platform specific policies) in memory, periodically scan a policy store 155 for updates to network policies, and notify and update network agents 105 with respect to changes in the network policies.

The user interface 120 receives input from users of the network policy platform 110. For example, the user interface 120 may be configured to receive user configured data for entities in the network from a network operator. The user configured data may include IP addresses, host names, geographic locations, departments, functions, a VPN routing/forwarding (VRF) table, or other data for entities in the network. The user interface 120 may be configured to collect the user configured data and store the data in the inventory store 150.

The user interface 120 may also be configured to receive one or more user intent statements. The user intent statements may be received from a network operator, application owner, or other administrator or through another entity via an application programming interface (API). A user intent statement is a high-level expression of one or more network rules that may be translated into a network policy.

The user interface 120 may pass a received user intent statement to the intent service 130 where the intent service 130 is configured to format the user intent statements and transform the user intent statement into network policies that may be applied to entities in the network. According to some embodiments, the intent service 130 may be configured to store the user intent statements, either in formatted or non-formatted form, in an intent store. After the user intent statements are translated into network policies, the intent service 130 may store the network policies in policy store 155. The policy store 155 is configured to store network policies. The network policies may be high-level platform independent network policies or platform specific policies. In some embodiments, the policy store 155 is implemented as a NoSQL database.

The intent service 130 may also track changes to intent statements and make sure the network policies in the policy store are up-to-date with the intent statements in the intent store. For example, if a user intent statement in the intent store is deleted or changed, the intent service 130 may be configured to located network policies associated with the deleted user intent statement and delete or update the network policies as appropriate.

The coordinator module 125 is configured to assign network agents 105 to EFEs. For example, the coordinator 125 may use a sharding technique to balance load and improve efficiency of the network policy platform 110. The coordinator 125 may also be configured to determine if an update to the policy store is needed and update the policy store accordingly. The coordinator 125 may further be configured to receive data periodically from the network agents 105 via the EFEs 115, store the data in the inventory store 150, and update the inventory store 150 if necessary.

FIG. 2 is an illustration showing contents of an inventory store 200, in accordance with various embodiments of the subject technology. The inventory store 200 is configured to contain data and attributes for each network entity managed by the intent driven network policy platform 110. The network entities may include machines (e.g., servers, personal computers, laptops), virtual machines, containers, mobile devices (e.g., tablets or smart phones), smart devices (e.g., set top boxes, smart appliances, smart televisions, internet-of-things devices), or network equipment, among other computing devices. Although the inventory store 200 is implemented as a conventional relational database in this example, other embodiments may utilize other types of databases (e.g., NoSQL, NewSQL, etc.).

The inventory store 200 may receive user configured data from the user interface 120 and data received from the network agents 105 via the EFEs 115 and store the data in records or entries associated with network entities managed by the network policy platform 110. Each record in the inventory store 200 may include attribute data for a network entity such as one or more entity identifiers (e.g., a host name, IP address, MAC addresses, hash value, etc.), a geographic location, an operating system, a department, interface data, functionality, a list of one or more annotations, file system information, disk mount information, top-of-rack (ToR) location, and a scope.

In some embodiments, the inventory store 200 may also include entity performance and network enforcement data either together with the attribute data or separately in one or more separate data stores. The performance and network enforcement data may include CPU usage, memory usage, a number of TCP connections, a number of failed connections, a number of network policies, or a number of data packets that have been allowed, dropped, forwarded, or redirected. The inventory store 200 may include historical performance or enforcement data associated with network entities or metrics calculated based on historical data.

A user intent statement is a high-level expression of that may be translated into one or more network policies. A user intent statement may be composed of one or more filters and at least one action. The filters may include inventory filters that identify network entities on which the action is to be applied and flow filters that identify network data flows on which the action is to be applied.

For example, if a user wished to identify all network entities located in Mountain View, Calif. (abbreviated MTV in the location column of the inventory store), the inventory filter "Location==MTV" may be used. If a user wished to identify all network entities located in a Research Triangle Park facility in North Carolina (abbreviated RTP in the location column of the inventory store), the inventory filter "Location==RTP" may be used. Inventory filters may also identify relationships between two or more sets of entities (e.g., a union or intersection of sets). For example, if a user wished to identify all network entities located in Mountain View, Calif. and running Windows 8 operating system, the inventory filter "Location==MTV and OS==Windows8" may be used.

A flow filter identifies network data flows. For example, if a user wished to identify all data flows from network entities in Mountain View to network entities in the Research Triangle Park facility, the following flow filter may be used:
    Source: Location==MTV
    Destination: Location==RTP Each filter may further be defined beforehand and assigned a name for more convenient use. For example, the inventory filter "Location==MTV" may be assigned the name "MTV_entities" and the inventory filter "Location==RTP" may be assigned the name "RTP_entities." As a result, a user may use the following to achieve the same result as the above example flow filter:

Source: MTV_entities
Destination: RTP_entities

Different actions may be applied to different filters. For example, actions applicable to inventory filters may include annotation and configuration actions. Annotating actions adds tags or labels to network items in the inventory store or flow data. Annotations may help network operators identify network entities. Configuration actions may be used to configure network entities. For example, some configuration actions may be used to set a CPU quota for certain applications, processes, or virtual machines. Other configuration actions may enable or disable monitoring of certain metrics, collection and transmittal of certain data, or enforcement of certain network policies. Some configuration actions may also be able to enable or disable certain modes within a network entity. For example, some entities may be configured to run in a "high visibility mode" in which most metrics and data (e.g., full time series data) are collected and transmitted to the network policy platform for analysis or in "low visibility mode" in which only a small subset of the available metrics and data are collected and transmitted. Some configuration actions are able to enable or disable these modes.

Actions applicable to flow filters may include annotation or network enforcement actions. Network enforcement actions include, for example, allowing data packets, dropping data packets, copying data packets, redirecting data packets, encrypting data packets, or load balance across network entities.

Using the above examples, a user that wishes to drop all data flowing from entities in Mountain View to entities in Research Triangle Park may use the following user intent statement:

Source: MTV_entities
Destination: RTP_entities
Action: Drop

User intent statements may further specify types of communications or communication protocols used, ports used, or use any other filter to identify a network entity or network flow on which to apply an action. For example, if the user only wishes to drop transmission control protocol (TCP) communications out of port 80 for these network entities, the following user intent statement may be used instead:

Source: MTV_entities
Destination: RTP_entities
Action: Drop
Protocol: TCP
Port:80

In another example, to disable all incoming connections to network entities running a Windows 8 operating system, a user can utilize the following user intent statement:

Source:*
Destination: Win8 Filter
Action: Drop

In the above user intent statement, "Win_Filter" is the name of an inventory filter that includes "OS==Windows8."

The example user intent statements above are presented for illustrative purposes. In some embodiments, user intent statements, inventory filters, flow filters, or actions may appear in different formats or even in a natural language format. For example, FIG. 3 illustrates two example inventory filters, in accordance with various embodiments of the subject technology. The first inventory filter 300 is named "Inventory_Filter_1" and is configured to identify all network entities in the inventory store that run on a Linux operating system and have a VRF ID of 676767. The second inventory filter 350 is named "Inventory_Filter_2" and is configured to identify all network entities in the inventory store that represent the 10.0.0.0/8 and 1.1.11.0/24 subnets.

FIG. 4 illustrates an example flow filter incorporating two inventory filters, in accordance with various embodiments of the subject technology. The flow filter 400 is configured to identify TCP data flows between the 10.0.0.0/8 and 11.0.0.1 subnets. The flow filter 400 further uses two inventory filters 405 and 410 to help identify the subnets.

Figure 5:
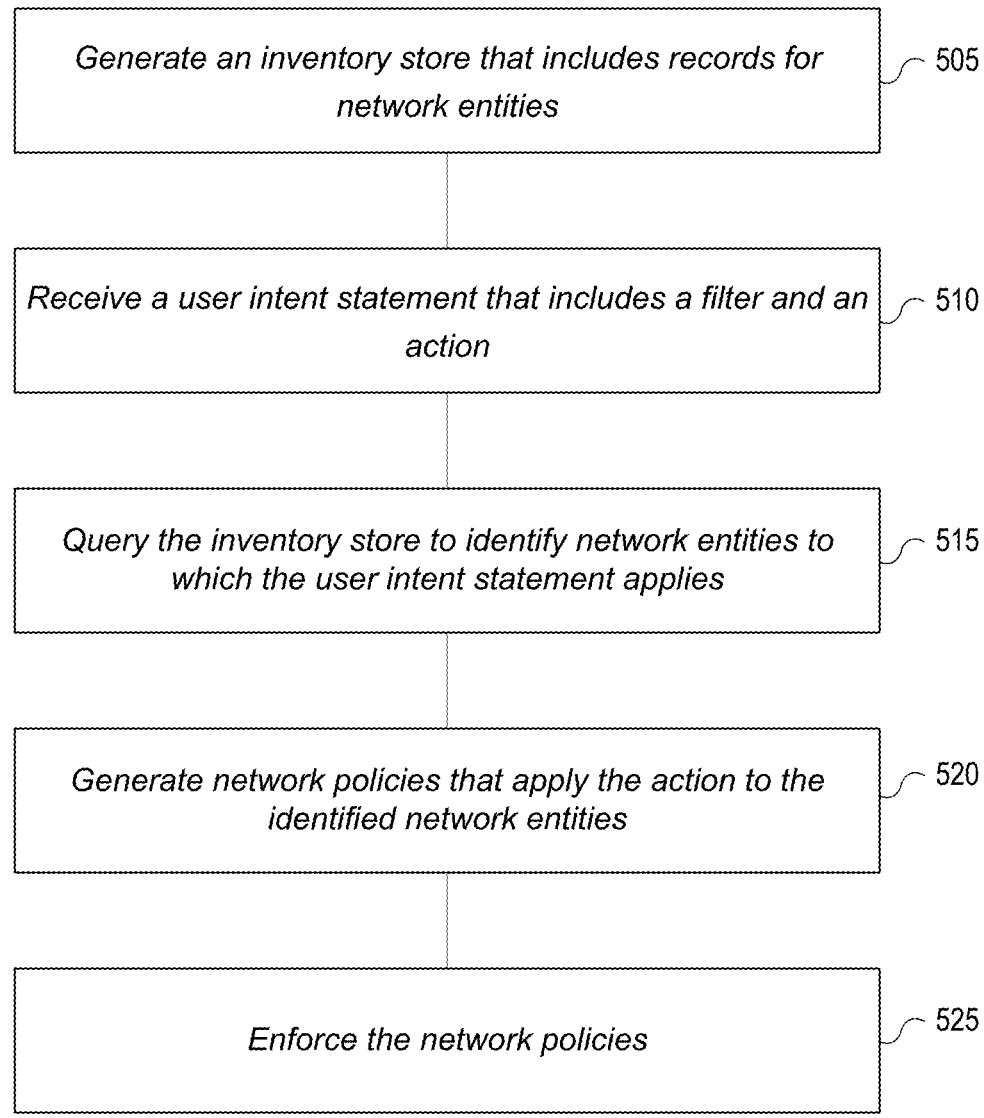
FIG. 5 shows an example process for managing a network using user intent statements, in accordance with various embodiments of the subject technology.

FIG. 5 shows an example process 500 for managing a network using inventory filters, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 500 can be performed by a network, and particularly, a network policy system (e.g., the network policy platform 110 of FIG. 1) or similar system.

At operation 505, the system may generate an inventory store that includes records for network entities in the network. The records may be created or updated based on configuration data received from a network operator. The configuration data may include various attributes of certain network entities. The attributes may include, for example, an internet protocol (IP) address, a host name, a geographic location, or a department. The configuration data may also include annotations, labels, VPN routing/forwarding (VRF) information, interface information, or any other data that may be used to identify one or more network entities.

The records may further be created, updated, or supplemented with information observed by network agents and reported to the network policy system by the network agents. This information may include operating system information, hostnames, interface information, entity identifiers, policy enforcement information, or data related to entity performance. Policy enforcement information may include a number of policies being enforced, a number of rules being enforced, a number of data packets being allowed, dropped, forwarded, redirected, or copied, or any other data related to the enforcement of network policies. Data related to entity performance may include CPU usage, memory usage, a number of TCP connections, a number of failed connection, applications or processes installed or running, disks that are mounted, or other time series data.

At operation 510, the system receives a user intent statement that includes at least one filter and an action. The user intent statement may be received from a network operator, application owner, or other administrator via a user interface or through another party or service via an application program interface (API). The filter may be an inventory filter configured to help identify network entities on which the action is to be applied or a flow filter configured to help identify network data flows on which the action is to be applied. The action may be an enforcement action, a configuration action, or an annotation action.

The system may query the inventory store to identify network entities to which the user intent statement applies at operation 515. For example, system may query the inventory store using the one or more filters found in the user intent statement to identify network entities that match the conditions of the filters. The filters may include one or more attributes that can be used to narrow down the network entities to only those to which the action is to be applied. The attributes may be, for example, an entity type (e.g., machine, virtual machine, container, process, etc.), an IP subnet, an operating system, or any other information that may be found in the inventory store and used to identify network entities.

At operation 520, the system generates network policies that apply the action to the network entities identified by the query. According to some embodiments, the network policies for user intent statements that include a flow filter or an enforcement action may be implemented in the form of one or more access control lists (ACLs). In some embodiments, network policies for user intent statements that include an annotation action or configuration action may be implemented in the form of instructions to the network entity or a network agent to implement the actions.

The system then enforces the network policies at operation 525. According to some embodiments, some network policies may be enforced on the system. However, in some embodiments, the system transmits the network policies to one or more network agents configured to implement the network policies on the network entities.

According to various embodiments of the disclosure, a user or service is able to provide a user intent statement that the system uses to generate multiple network policies. Accordingly, the user need not spend time and resources explicitly crafting each network policy. Instead, the user may specify a reduced number of user intent statements that express the user's network management desires. Furthermore, the user intent statements are more understandable to network operators and application owners and the system is configured to take the user intent statements and translate the statements into network policies that network agents or network entities may use to implement the user's network management desires.

Some networks may be quite large and include a large number of network entities serving several departments and several functions within those departments. In some cases, more than one network operator may be tasked with managing the network and each network operator may be responsible for certain portions of the network which may or may not overlap. Various embodiments of the subject technology enable network operators to apply user intent statements to network entities (e.g., servers) and network flows that the network operator is authorized to manage, prevent network operators from applying user intent statements to network entities and network flows that the network operator is not authorized to manage, and address conflicting user intent statements if they exist.

For example, the network policy platform may include a user database that includes entries for each network operator authorized to manage the network. Each entry in the user database may reference a network operator any specify one or more scopes that the network operator is authorized to manage. These scopes may correspond to the one or more scopes associated with a network entity as specified in the network entity's record stored in the inventory store. The scopes may be assigned to the network entity by a network operator as part of the configuration data received by the user interface of the network policy platform. In some embodiments the scopes in the entry associated with a network operator may be tied to a privilege. For example, each privilege that a network operator has (e.g., read, write, modify, create, delete, enforce a network policy, etc.) may be associated with a scope for that privilege.

According to some embodiments, the scopes may be organized into a hierarchy.

Figure 6:
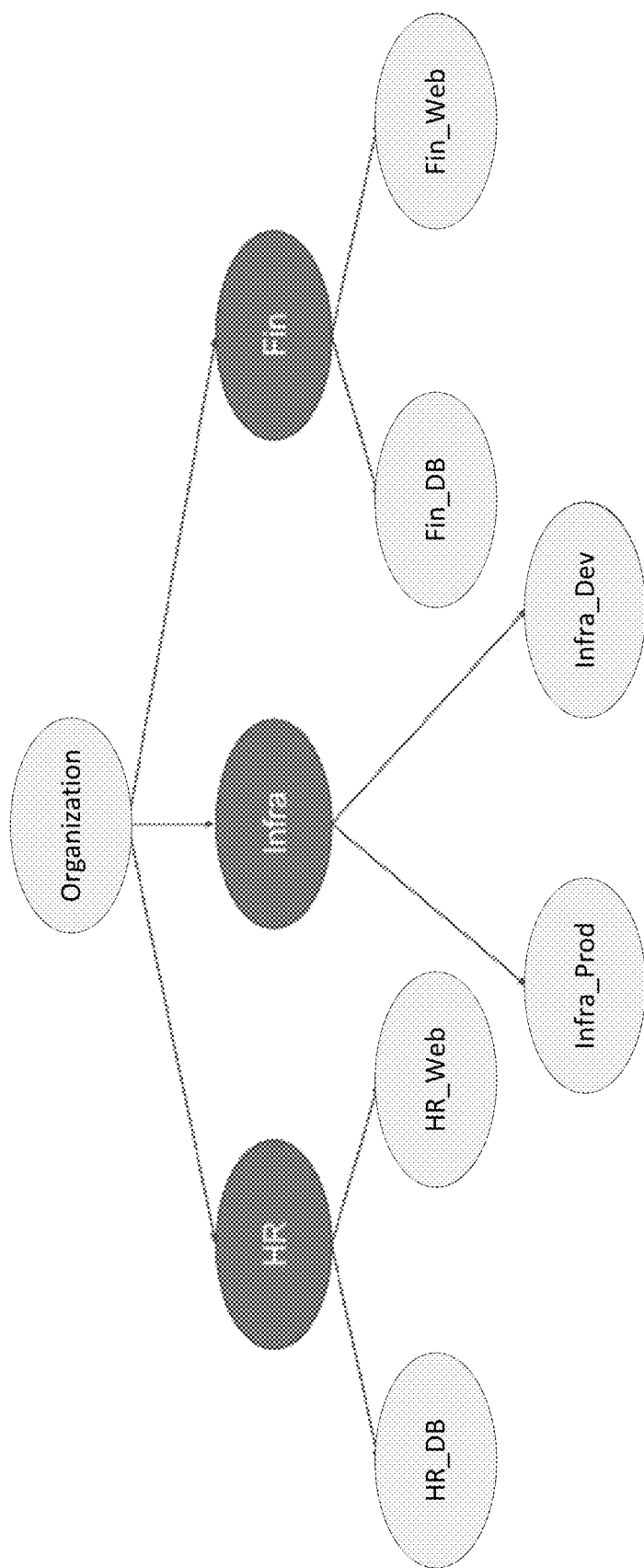
FIG. 6 is a diagram illustrating an example of a scope hierarchy, in accordance with various embodiments of the subject technology.

FIG. 6 is a diagram illustrating an example of a scope hierarchy, in accordance with various embodiments of the subject technology. In some embodiments, the hierarchy may mirror an organizational hierarchy or org chart, as is illustrated in FIG. 6. However, in other embodiments, other organization models or hierarchies may be used. In the simplified example of FIG. 6, the organization is split between 3 first tier scopes of human resources (HR), infrastructure (Infra), and finance (Fin). HR is further split between database network entities (HR_DB) and web network entities (HR_Web). Infra is split between production network entities (Infra Prod) and development network entities (Infra_Dev). Finance is split between database network entities (Fin_DB) and web network entities (Fin_Web).

In some embodiments, a user that is assigned a scope may have permission to manage all child scopes for that scope. For example, if a network operator is assigned the root "Organization" scope, the network operator is able to manage all network entities and flows in the entire organization. If, on the other hand, the network operator is assigned to the "Fin" scope, the network operator is able to manage all network entities and flow associated with the "Fin" scope, i.e., the "Fin_DB" scope, and the "Fin_Web" scope. In other embodiments, a network operator must explicitly be assigned to all scopes that they are authorized to manage and if the scope is not explicitly assigned to the network operator, the network operator is not authorized to manage network entities or flows associated with that scope.

When the user submits a user intent statement to the network policy platform, the network policy platform may access the user database, locate the user's entry, and identify the one or more scopes that the user is authorized to manage. When the network policy platform queries the inventory store to identify network entities or network flows to which the user intent statement applies, the one or more scopes assigned to the user and to the network entities (e.g., in the scope column of the inventory store) are used to filer the network entities and network flows in order to select only the network entities and network flows that the user is authorized to manage. The network policy platform may then generate network policies that only apply to identified network entities or network flows that the user is authorized to manage.

In some situations, two or more user intent statements may conflict and apply to the same network entities or network flows. For example, managers may create user intent statements to manage large sets of resources in the network while a lower level network operator may create one or more conflicting user intent statements for the subset of network resources for which they are responsible. In some situations, the manager may want their user intent statements to override the lower level network operator user intent statements, while other times, the manager may want to defer to the lower level network operator with more specific knowledge of the resources they are responsible for and have the network operator's user intent statements override. However, prioritizing the user intent statements and dealing with conflicting user intent statements is difficult and confusing, especially with a large number of network policies and network resources.

Various embodiments relate to resolving conflicts between user intent statements by using an enforcement hierarchy that includes a user defined order of precedence. When creating user intent statements, a user may specify whether a user intent statement is associated with an "absolute" priority or a "default" priority. A user intent statement assigned an absolute priority is one that the creator wishes to override other conflicting user intent statements that the creator is permitted to override. A user intent statement assigned a default priority may be overridden by other user intent statements. In some embodiments, the different priority levels (e.g., an "absolute" priority or a "default" priority) may be named differently or more than two priority levels may be used. Accordingly, various embodiments allow user intent statements to be processed and enforced based on a priority level.

According to some embodiments, the network policy platform may also allow a network administrator to set an ordering scopes in which user intent statements directed to network entities or network flows are processed and enforced based on the ordering of the scopes associated with the network entities or network flows. In some embodiments, an ordering of scopes and different priority levels may be used together to process and enforce user intent statements.

In an illustrative example, a network administrator may set an ordering of scopes to be S1, S2, S3, and S4, where S1 through S4 are scopes. Additionally, some user intent statements may be prioritized as "absolute" or "default." The network policy platform may process and enforce the user intent statements according to the following order:

1. Absolute user intent statements directed towards network entities or flows associated with the S1 scope;
2. Absolute user intent statements directed towards network entities or flows associated with the S2 scope;
3. Absolute user intent statements directed towards network entities or flows associated with the S3 scope;
4. Absolute user intent statements directed towards network entities or flows associated with the S4 scope;
5. Default user intent statements directed towards network entities or flows associated with the S4 scope;
6. Default user intent statements directed towards network entities or flows associated with the S3 scope;
7. Default user intent statements directed towards network entities or flows associated with the S2 scope; and
8. Default user intent statements directed towards network entities or flows associated with the S1 scope.

Various embodiments of the subject technology discussed herein relate to a more intuitive way to manage a network and a way to manage the network in a more targeted manner. For example, user intent statements allow users to define network rules in a more understandable manner. These user intent statements may be translated into network policies and stored in a policy store such as policy store 155 illustrated in FIG. 1. Depending on the use case, in some cases, the number of network policies may grow to a point at which it is difficult to store and inefficient to process read and write operations.

Various embodiments relate to providing technical solutions to these technical problems. In some embodiments, a distributed file system such as a Hadoop distributed file system (HDFS) may be used to store the network policies. On a HDFS storage implementation, the network policies may be split into a number of large blocks which are then distributed across nodes. The HDFS storage is able to handle very large amounts of data, scalable as additional nodes may be easily added to the framework, and resilient to failure.

However, searching through an entire HDFS store to find network policies directed to a particular network entity may be cumbersome, time consuming, and resource consuming. Grouping together network policies based on the network entities they act upon and storing those network policies into separate files may be done to increase efficiency, however this may result in a large number of smaller files, which is difficult for HDFS implementations to handle and inefficient as this results in many seek operations and hopping from node to node to retrieve each small file.

Figure 7:
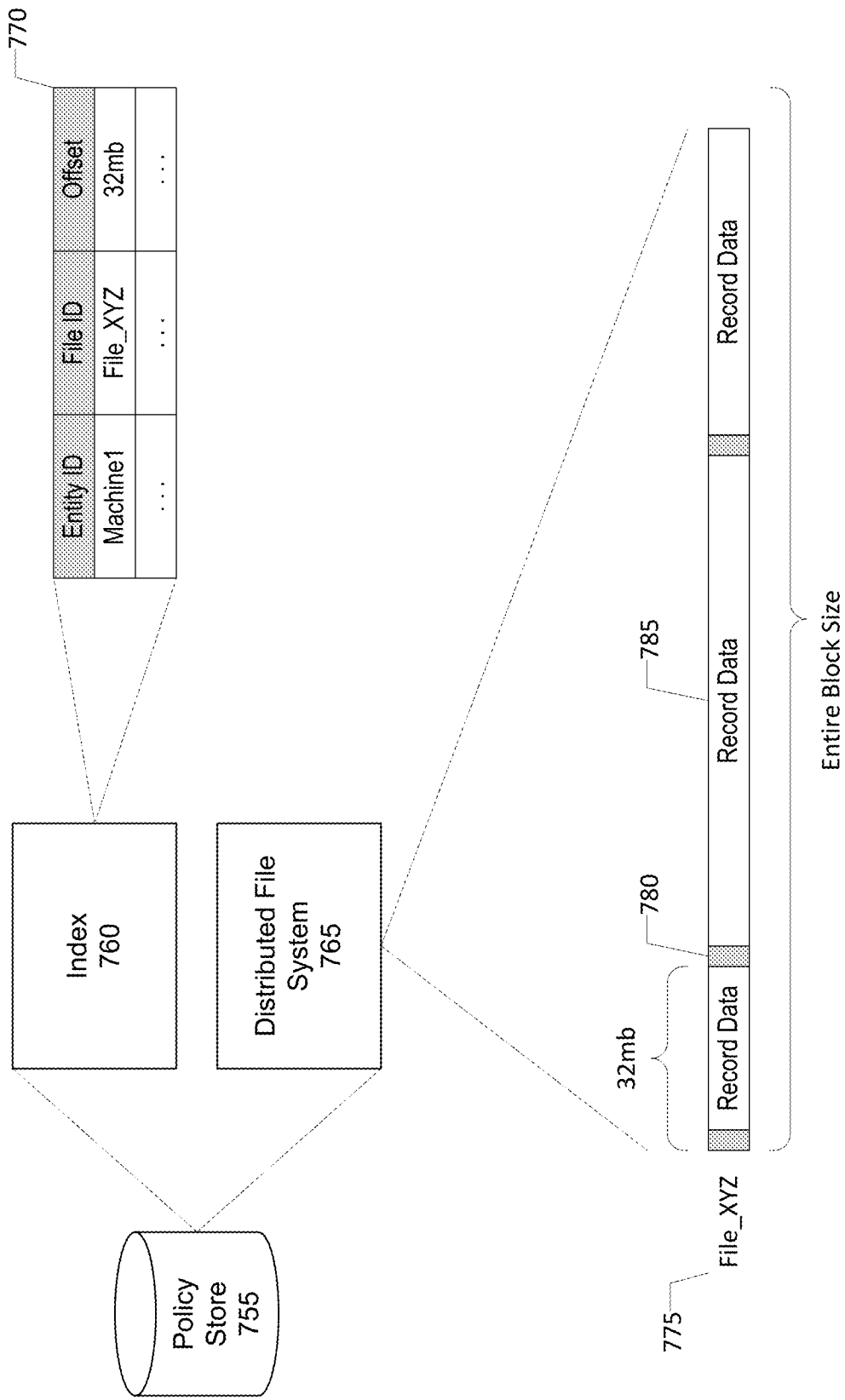
FIG. 7 is a conceptual block diagram illustrating an example of a policy store, in accordance with various embodiments of the subject technology.

Accordingly, in some embodiments, a network policy platform uses a distributed file system with an index to efficiently handle read and writes to network policies. FIG. 7 is a conceptual block diagram illustrating an example of a policy store 775, in accordance with various embodiments of the subject technology. The policy store 775 in FIG. 7 is implemented using an index 760 and a distributed file system 765. The index 760 may be any type of database such as a NoSQL database like MongoDB™. The distributed file system 765 may be a Hadoop Distributed File System (HDFS) or any other distributed file system or clustered file system.

The index 760 in FIG. 7 is configured to store information that allows the network policy system to locate policies associated with particular network entities on the distributed file system 765. The index 760 in FIG. 7 is shown containing one or more entries for network entities 770. Each entry may include a network entity identifier, a file identifier, and an offset. As will be discussed in further detail, the information in the entry allows the network policy system to locate policies associated with particular network entities on the distributed file system 765.

In some embodiments, network policies may be grouped based on the network entities on which the network policies are to be applied. Each set of network policies applicable to a particular network entity may be stored together in a record for the network entity. The record is then stored in a file in the distributed file system 765.

Some implementations of distributed file systems operate best with large files. When there are many small files, the performance and efficiency of these distributed file systems may be reduced. Accordingly, in order to maximize the storage space and operating performance, the file may also include records for other network entities. As seen in FIG. 7, the distributed file system 765 may consist of several data blocks. Each data block may include one or more files (e.g., file 775) and each file may include one or more records containing network policies for network entities. According to some embodiments, each data block may include a single file and the file may contain as many records as can fit within the data block, however, the file size is not to exceed the block size for the distributed file system 765. In some embodiments, if an entire record cannot fit into one file, another file is created and the record is stored in the new file such that network policies for a particular network entity are in the same file and not split among different files. In some embodiments, network policies may be split among separate files.

To access policies for a particular network entity, whether it be to enforce the policies, add policies to the record, remove policies to the record, or update policies, a network policy system identifies an entry for the network entity in the index 760 using an entity identifier. The entity identifier may be a host name, IP address, a hash value, label, or any other identifying data. In the example shown in FIG. 7, the entity identifier for the network identifier is "Machine1." Based on the entry, the network policy system determines a file identifier for a file containing the record for the network entity and an offset indicating a location of the record in the file. The file identifier may be a file name, a label, a hash value, a location, or any other data that may be used to identify a file in the distributed file system. In the example shown in FIG. 7, the file identifier is the file name "File_XYZ" and the offset is 32 megabytes.

The network policy system uses the file name ("File_XYZ") to identify the file 775 where the record for the network entity is located and uses the offset to quickly determine the location of the record for the network entity in the file. The offset allows the network policy system to jump to the desired data instead of needing to read unnecessary portions of the file 775 in order to find the record.

According to some embodiments, the size of each record may be different and the size of the record may be stored in a specified location so that the network policy system may quickly determine how large the record is and how much data needs to be retrieved in order to retrieve the entire record. In other embodiments, however, records may be the same size and/or a specified location is not used. In some embodiments, the network policy system may jump to the location of the record and read a first portion (e.g., a header portion) of data that contains information regarding the size of the record. The network policy system may read the header portion 780, determine the size of the record, and retrieve the record data 785 for use. In other embodiments, the location that contains size information may be in other locations in the file, in the entry stored in the index, or in another location. The record data includes the network policies for the entity and can be viewed or altered.

Figure 8:
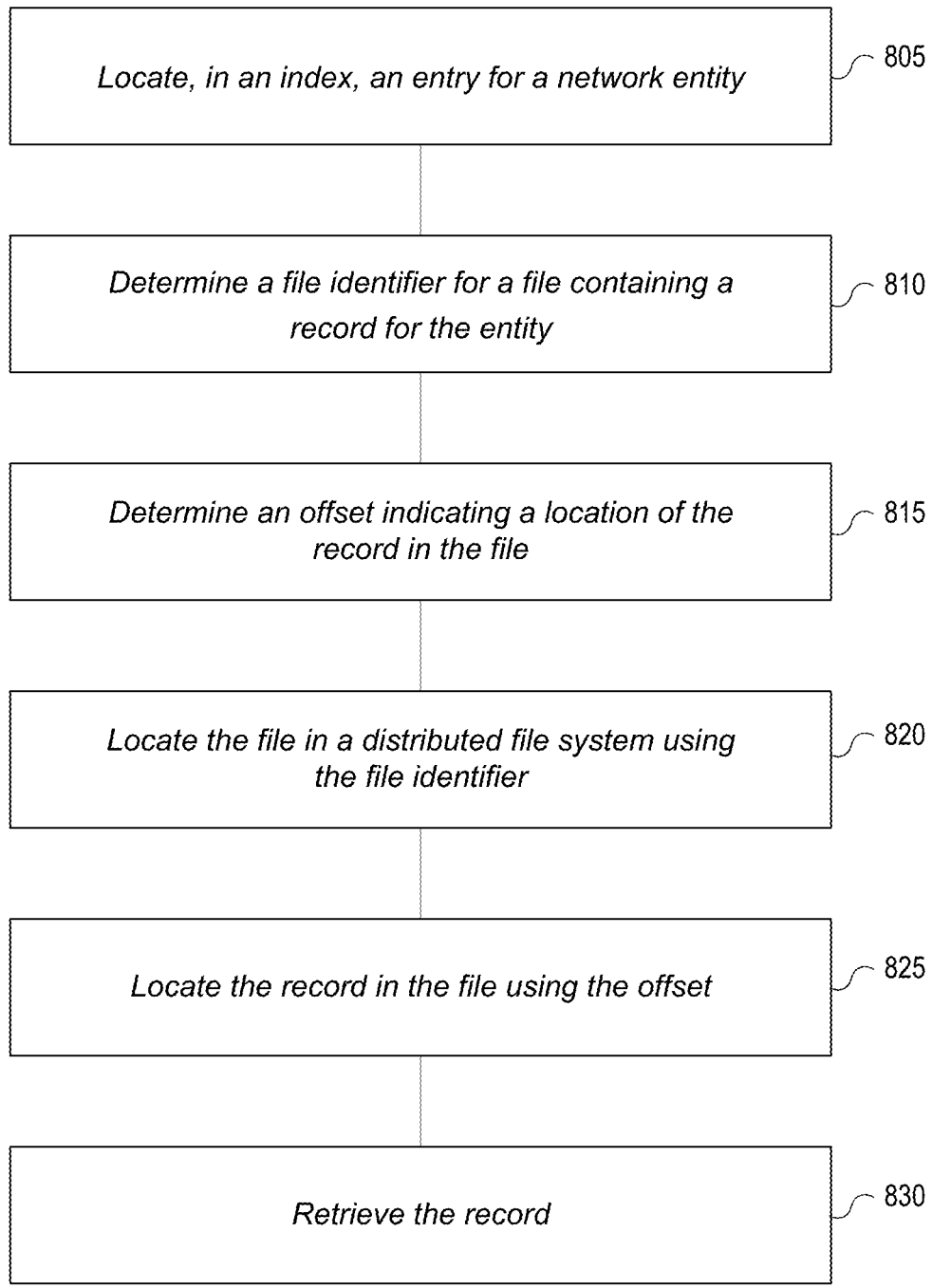
FIG. 8 shows an example process for accessing a record in the distributed file system, in accordance with various embodiments of the subject technology.

FIG. 8 shows an example process for accessing a record in the distributed file system, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 800 can be performed by a network, and particularly, a network policy system (e.g., the network policy platform 110 of FIG. 1) or similar system.

The system may wish to access the record for a network entity in order to enforce network policies located therein, update network policies for the network entity, or for any other reason. At operation 805, at network policy system may locate, in an index, an entry for a desired network entity. At operation 810, the network policy system may read the entry and determine a file identifier for a file containing a record for the network entity and an offset indicating a location of the record in the file at operation 815. The network policy system may locate the file in a distributed file system using the file identifier at operation 820 and locate the record in the file using the offset at 825. At operation 830, the network policy system retrieves the record.

Figure 9:
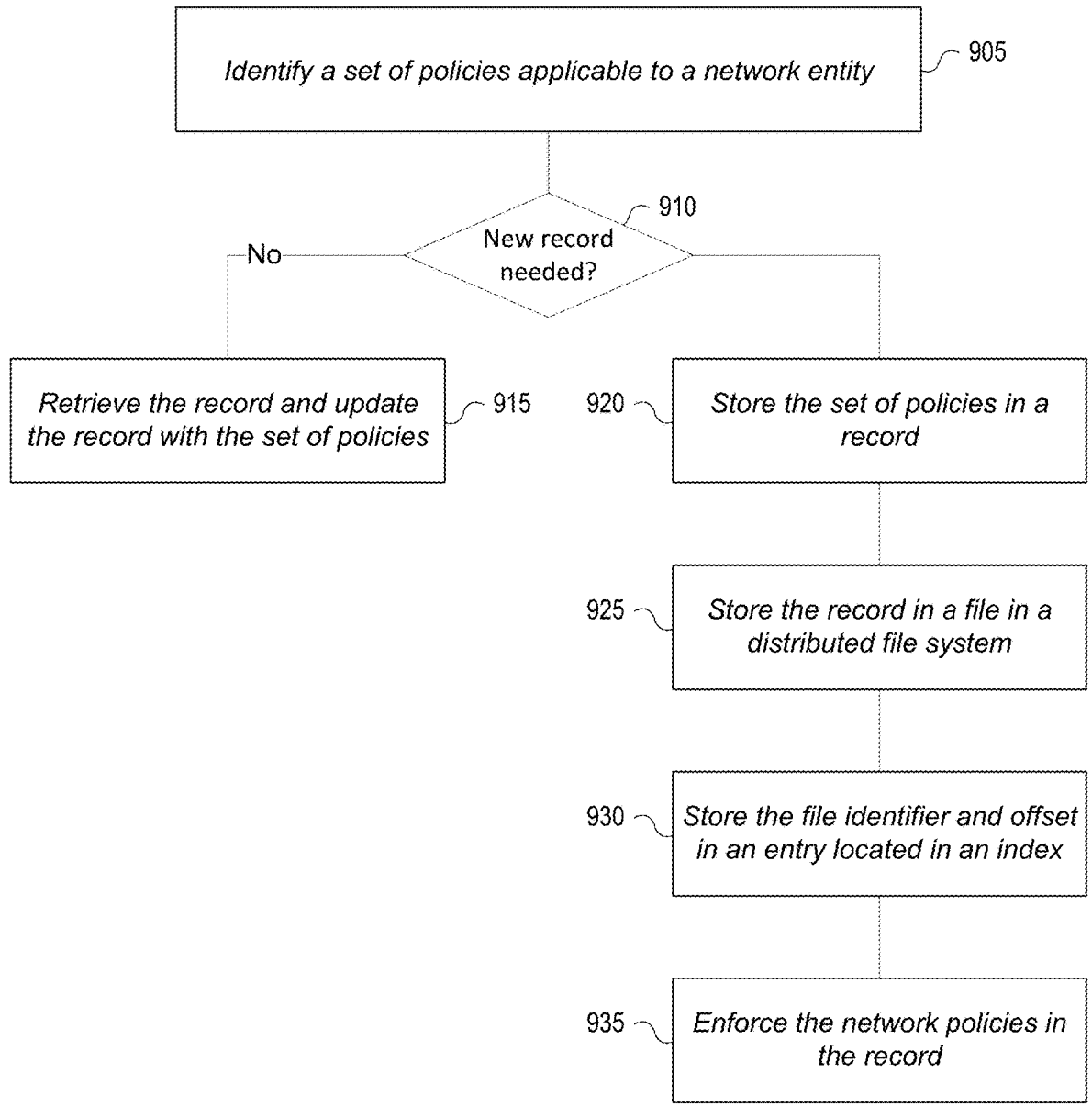
FIG. 9 shows an example process for storing a record in the distributed file system, in accordance with various embodiments of the subject technology.

FIG. 9 shows an example process for storing a record in the distributed file system, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 900 can be performed by a network, and particularly, a network policy system (e.g., the network policy platform 110 of FIG. 1) or similar system.

A network policy system may store a record in the distributed file system after updating an existing record or creating a new record. For example, the network policy system may receive a user intent statement, query an inventory store to identify the network entity to which the user intent statement applies, and generate network policies based on the user intent statement and instructions to update the policies stored in a distributed file system.

At operation 905, the network policy system organizes the network policies based on the network entities that they operate on and identifies a set of policies applicable to a particular network entity. At operation 910, the network policy system determines if there is an existing record for the network entity in the distributed file system or if a new record needs to be created to store the set of policies. If a record exists and, therefore, a new record does not need to be created, at operation 915, the network policy system may retrieve the record (as is illustrated in, for example, FIG. 8) and update the record with the set of policies.

If no record exists, at operation 920, the network policy system creates a new record for the network entity and stores the set of policies applicable to the network entity in the record. The network policy system stores the new record in a file in the distributed file system at operation 925. In some embodiments, the network policy system may determine the size of the record and locate a file in the distributed file system that the record may fit such that the record is not split between two files and the file can fit into the maximum block size of the distributed file system. According to some embodiments, the size of the record may further be stored in a header of the record, in a portion immediately preceding or following the record, or in another location accessible to the network policy system.

At operation 930, the network policy system stores a file identifier for the file in that the record was stored in and an offset for the location of the record in an entry located in an index database that is separate from the distributed file system. Once the policies are stored in the distributed file system, they may be enforced by the network policy system. For example, at operation 935, the network policy system may enforce the network policies in the network by, for example, transmitting the record for the network entity to a network agent configured to implement the set of policies on the network entity.

Figure 10A:
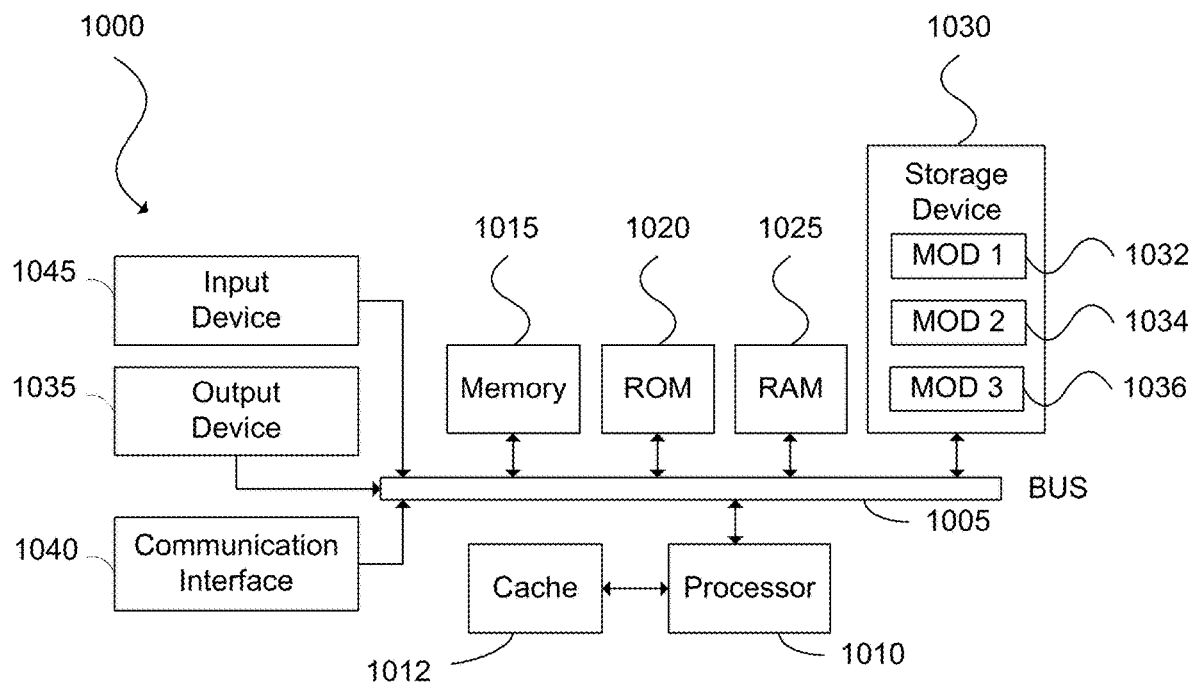
FIGS. 10A and 10B illustrate examples of systems in accordance with some embodiments.
Figure 10B:
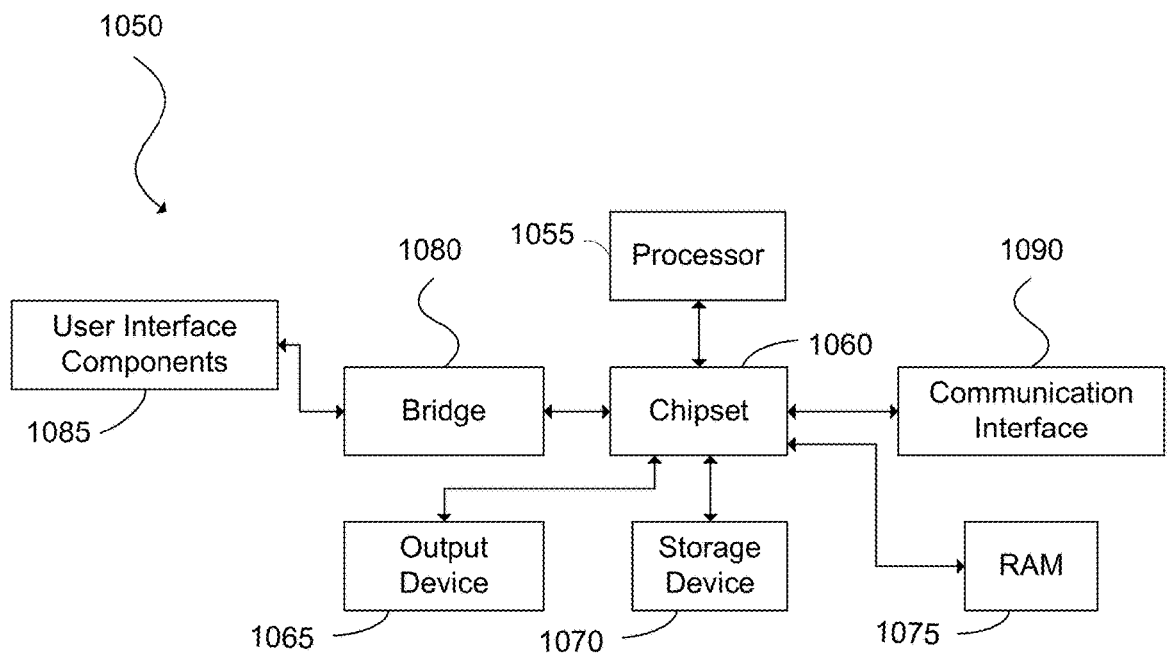

FIG. 10A and FIG. 10B illustrate systems in accordance with various embodiments. The more appropriate system will be apparent to those of ordinary skill in the art when practicing the various embodiments. Persons of ordinary skill in the art will also readily appreciate that other systems are possible.

FIG. 10A illustrates an example architecture for a conventional bus computing system 1000 wherein the components of the system are in electrical communication with each other using a bus 1005. The computing system 1000 can include a processing unit (CPU or processor) 1010 and a system bus 1005 that may couple various system components including the system memory 1015, such as read only memory (ROM) in a storage device 1020 and random access memory (RAM) 1025, to the processor 1010. The computing system 1000 can include a cache 1012 of high-speed memory connected directly with, in close proximity to, or integrated as part of the processor 1010. The computing system 1000 can copy data from the memory 1015 and/or the storage device 1030 to the cache 1012 for quick access by the processor 1010. In this way, the cache 1012 can provide a performance boost that avoids processor delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-protected screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can govern and manage the user input and system output. There may be no restriction on operating on any particular hardware arrangement and therefore the basic features here may easily be substituted for improved hardware or firmware arrangements as they are developed.

Storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, output device 1035, and so forth, to carry out the function.

FIG. 10B illustrates an example architecture for a conventional chipset computing system 1050 that can be used in accordance with an embodiment. The computing system 1050 can include a processor 1055, representative of any number of physically and/or logically distinct resources capable of executing software, firmware, and hardware configured to perform identified computations. The processor 1055 can communicate with a chipset 1060 that can control input to and output from the processor 1055. In this example, the chipset 1060 can output information to an output device 1065, such as a display, and can read and write information to storage device 1070, which can include magnetic media, and solid state media, for example. The chipset 1060 can also read data from and write data to RAM 1075. A bridge 1080 for interfacing with a variety of user interface components 1085 can be provided for interfacing with the chipset 1060. The user interface components 1085 can include a keyboard, a microphone, touch detection and processing circuitry, a pointing device, such as a mouse, and so on. Inputs to the computing system 1050 can come from any of a variety of sources, machine generated and/or human generated.

The chipset 1060 can also interface with one or more communication interfaces 1090 that can have different physical interfaces. The communication interfaces 1090 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in the storage device 1070 or the RAM 1075. Further, the computing system 1000 can receive inputs from a user via the user interface components 1085 and execute appropriate functions, such as browsing functions by interpreting these inputs using the processor 1055.

It will be appreciated that computing systems 1000 and 1050 can have more than one processor 1010 and 1055, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving a user intent statement including an action that is capable of being performed in a network environment through one or more network policies for the network environment;
   querying an inventory store to identify a network entity associated with the user intent statement;
   generating the one or more network policies that apply the action to the network entity based on the action included in the user intent statement; and
   enforcing the one or more network policies on the network entity;
   wherein the network entity associated with the user intent statement is identified from the inventory store based on an inventory filter that is included in the user intent statement and indicative of the network entity.

2. The method of claim 1, wherein the one or more network policies are implemented on the network entity by transmitting the one or more network policies to a network agent configured to implement the one or more network policies on the network entity.

3. The method of claim 1, wherein the user intent statement is indicative of a plurality of network entities including the network entity.

4. The method of claim 1, wherein the action is an enforcement action associated with the network entity.

5. The method of claim 1, wherein the action is a configuration action for configuring the network entity.

6. The method of claim 1, wherein the inventory store is generated based on observed data associated with the network entity.

7. The method of claim 1, wherein the inventory store is generated based on configuration data associated with the network entity.

8. The method of claim 1, further comprising:
   identifying a position of the user intent statement in an enforcement hierarchy of a plurality of user intent statements; and
   applying the user intent statement from the plurality of user intent statements based on the position of the user intent statement in the enforcement hierarchy.

9. A system comprising:
   one or more processors; and
   a computer-readable medium comprising instructions stored therein, which when executed by the one or more processors, cause the one or more processors to:
   receive a user intent statement including an action that is capable of being performed in a network environment through one or more network policies for the network environment;
   query an inventory store to identify a network entity associated with the user intent statement;
   generate the one or more network policies that apply the action to the network entity based on the action included in the user intent statement; and
   enforce the one or more network policies on the network entity;
   wherein the network entity associated with the user intent statement is identified from the inventory store based on an inventory filter that is included in the user intent statement and indicative of the network entity.

10. The system of claim 9, wherein the one or more network policies are implemented on the network entity by transmitting the one or more network policies to a network agent configured to implement the one or more network policies on the network entity.

11. The system of claim 9, wherein the user intent statement is indicative of a plurality of network entities including the network entity.

12. The system of claim 9, wherein the action is an enforcement action associated with the network entity.

13. The system of claim 9, wherein the action is a configuration action for configuring the network entity.

14. The system of claim 9, wherein the inventory store is generated based on observed data associated with the network entity.

15. The system of claim 9, wherein the inventory store is generated based on configuration data associated with the network entity.

16. The system of claim 9, wherein the instructions, which when executed by the one or more processors, further cause the one or more processors to:
   identify a position of the user intent statement in an enforcement hierarchy of a plurality of user intent statements; and
   apply the user intent statement from the plurality of user intent statements based on the position of the user intent statement in the enforcement hierarchy.

17. A non-transitory computer-readable storage medium comprising instructions stored therein, which when executed by one or more processors, cause the one or more processors to:
   receive a user intent statement including an action that is capable of being performed in a network environment through one or more network policies for the network environment;
   query an inventory store to identify a network entity associated with the user intent statement;
   generate the one or more network policies that apply the action to the network entity based on the action included in the user intent statement; and
   enforce the one or more network policies on the network entity;
   wherein the network entity associated with the user intent statement is identified from the inventory store based on an inventory filter that is included in the user intent statement and indicative of the network entity.

18. The non-transitory computer-readable storage medium of claim 17, wherein the instructions, which when executed by the one or more processors, further cause the one or more processors to:
   identify a position of the user intent statement in an enforcement hierarchy of a plurality of user intent statements; and
   apply the user intent statement from the plurality of user intent statements based on the position of the user intent statement in the enforcement hierarchy.

* * * * *